United States Patent [19]

Miller et al.

[11] Patent Number: 5,055,657

[45] Date of Patent: Oct. 8, 1991

[54] VENDING TYPE MACHINE DISPENSING A REDEEMABLE CREDIT VOUCHER UPON PAYMENT INTERRUPT

[75] Inventors: Gert Miller, Mönchen-Gladbach; Heinz-Gerd Jendges, Kempken St. Hubert; Norbert Crynen, Iönchen-Gladbach, all of Fed. Rep. of Germany

[73] Assignee: Scheidt & Bachmann Gesellschaft Mit Beschränkter Haftung, Mönchen-Gladbach, Fed. Rep. of Germany

[21] Appl. No.: 387,018

[22] Filed: Jul. 28, 1989

[30] Foreign Application Priority Data

Dec. 5, 1988 [EP] European Pat. Off. ........... 88120253

[51] Int. Cl.[5] ................................................ G06F 7/08

[52] U.S. Cl. ........................................ 235/381; 902/18

[58] Field of Search ............... 235/381, 384, 379, 432; 902/13, 18

[56] References Cited

U.S. PATENT DOCUMENTS 3,984,660 10/1976 Oka et al. ............................ 235/381
4,720,785 1/1988 Shapiro ............................... 235/384
4,778,983 10/1988 Ushikubo ............................ 235/381
4,833,307 5/1989 Gonzales-Justiz .................. 235/381

FOREIGN PATENT DOCUMENTS 2042254 2/1971 France .
2604546 4/1988 France .
2128794 5/1984 United Kingdom .

OTHER PUBLICATIONS

Patent Abstract of Japan, vol. 6, No. 30 (P-103) (908), 23 Feb. 1982; JP-A-56 149 663 (Oki Denki Kogyo K.K.).

*Primary Examiner*—Stuart S. Levy
*Assistant Examiner*—Edward H. Sikorski
*Attorney, Agent, or Firm*—Robert W. Becker & Associates

[57] ABSTRACT

A vending-type machine for goods and/or services, and a method of operating the same. The machine has a computer that is connected via a data communication line with a central computer located in a central office. In order, despite the absence of an intermediate cash box for bills received during an interrupted payment process, to be able to protect against fraudulent refunds for equivalent values on vouchers issued by such machines, a plain language as well as machine-readable coded data entry is printed on the voucher, with this data entry, in addition to the value of the bill, also containing the location indication of the particular machine, and the actual date and time in seconds. This data entry is entered in a data-protected memory of the machine, and is entered via the data communication line in a data-protected memory of the central computer. Upon redemption of the voucher at the central office, the coded data entry is read and this is compared with the data stored in the memory of the central computer prior to paying out the equivalent value.

6 Claims, 2 Drawing Sheets

VENDING TYPE MACHINE DISPENSING A REDEEMABLE CREDIT VOUCHER UPON PAYMENT INTERRUPT

BACKGROUND OF THE INVENTION

The present invention relates to a method of operating a vending-type machine for goods and/or services, with the machine having a computer that is connected via a data communication line with a central computer located in a central office. The machine further includes a bill-checking mechanism, which is followed directly by a bill-processing device that has a cash box, as well as a printer, which, upon interruption of a payment procedure after the transfer of at least one bill into the cash box, prints out a promissory note or voucher for the equivalent of the received bill as proof of entitlement for receiving a refund in the central office. The present invention also relates to a vending-type machine of the aforementioned general type for carrying out the inventive method.

Various embodiments of vending-type machines for goods and/or services are known. Such machines serve on the one hand for the sale of goods, especially beyond the normal hours of operation, for example in the form of so-called automated fuel pumps for dispensing liquid fuel. On the other hand, vending-type machines for services are used to determine individual periods of use, for example in a parking garage or at a swimming pool, and to settle the account of a respective user.

The goods or services are paid for by depositing coins and bills; with some vending-type machines, credit cards can also be used for payment. Not only the coins but also the bills are checked to see if they are genuine prior to transferring them to the respective cash box of the machine. Counterfeit money is returned immediately after the checking process, so that a user cannot utilize such a vending-type machine to exchange counterfeit money for genuine money.

Since with the heretofore known vending-type machines for goods and/or services it must be possible to interrupt a payment process, for example because the customer no longer desires the goods or because the type of payment for services attempted by the customer cannot be carried out, the known machines are equipped with intermediate cash boxes from which, upon interruption of a payment process, the money that has already been paid in is returned to the customer. However, such intermediate cash boxes for vending-type machines that are equipped with a bill-processing device are extremely complicated and expensive.

For this reason, with a number of vending-type machines that are equipped with bill-processing devices yet have no intermediate cash box for the collected bills, a voucher is issued on which the equivalent value for paid bills is printed upon the interruption of a payment process. Upon presentation of this voucher at the central office with which a particular vending-type machine is associated, the customer receives the cash equivalent for the bills received by the machine.

Since such vouchers can be produced with little capital expenditure, depending upon the printing process and the nature of the cards used for the vouchers, the possibility exists for the theft of very high sums of money due to forgery of vouchers. Based on the new statutory liability regulations, unforeseeable rights to compensation can result against the manufacturer of the vending-type machine.

It is an object of the present invention to provide a method of operating a vending-type machine for goods and/or services of the aforementioned general type, as well as a vending-type machine for carrying out this method, whereby, despite the absence of an intermediate cash box for bills that have been received, fraud due to falsified or forged vouchers is precluded.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
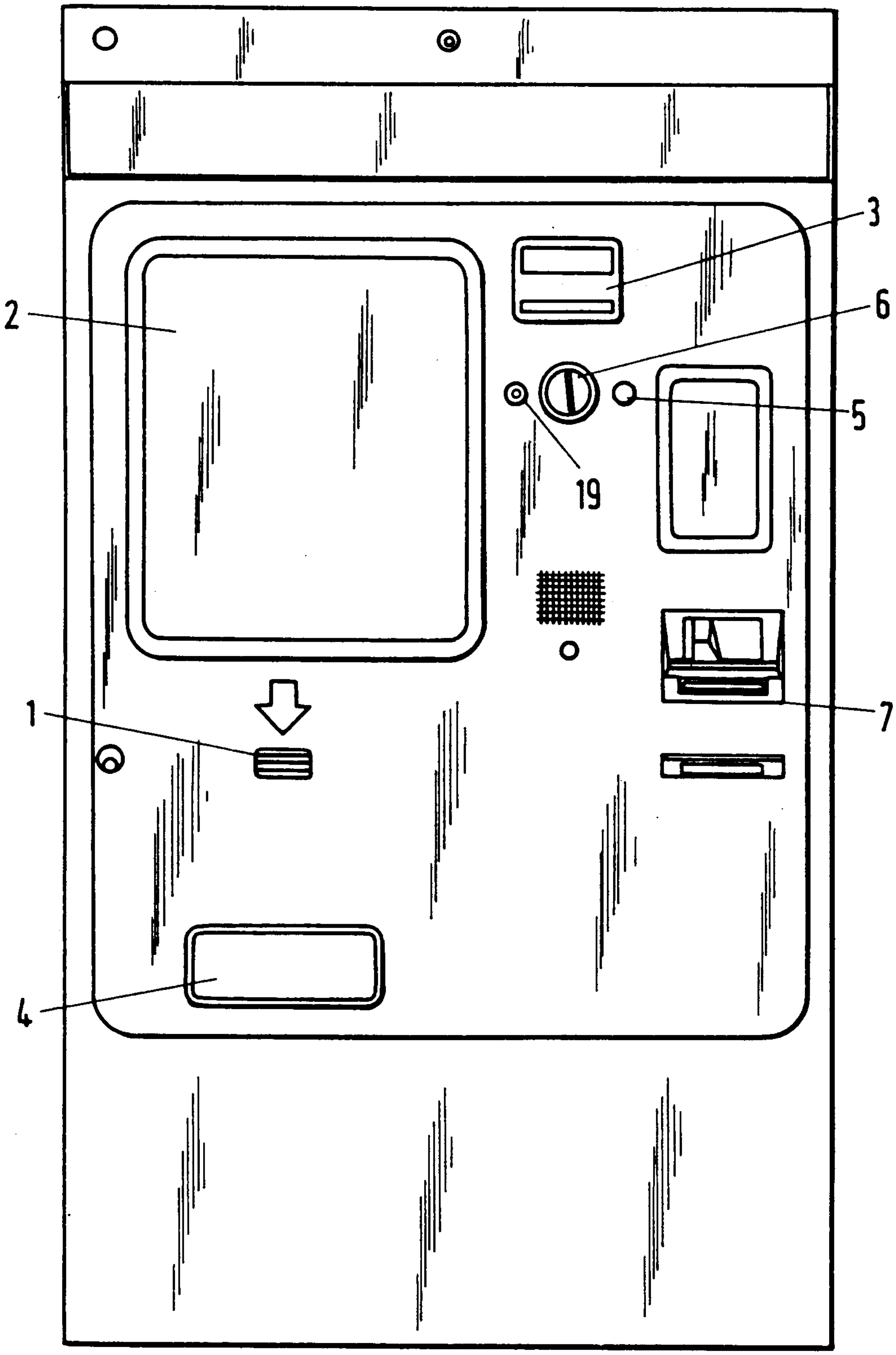
FIG. 1 is a front view of one exemplary embodiment of the inventive vending-type machine.

The method of the present invention is characterized by the steps of: printing on the voucher a plain language as well as machine-readable coded data entry that in addition to the value of the bank note, also includes the location indication of the machine, for example the number thereof, and the actual date and time in seconds; entering this data entry in a data-protected memory of the machine and also entering this data entry, via the data communication line, into a data-protected memory of the central computer; and upon redemption at the central office, reading the coded data entry in a data reader and comparing this read data with the data stored in the memory of the central computer prior to paying out the equivalent value.

Without great capital outlay, the inventive method assures that in the central office only those vouchers will be honored and redeemed that carry a data entry that can be located in the pertaining data bank of the central computer. Since data entries on forged vouchers are not stored in the memory of the central computer, pursuant to the inventive method the payment of money will be restricted to those cases where due to an interrupted payment process in one of the vending-type machines that is connected to the central office, in fact bills were received for the equivalent value of which the customer received no goods or services.

Pursuant to a further specific feature of the present invention, the data entry can be printed out on a connected printer after transfer of the data entry into the data-protected memory of the central computer. Furthermore, after completion of transfer via the data communication line to the memory of the central computer, the data entry can, pursuant to the present invention, be cleared in the memory of the particular vending-type machine.

Pursuant to one preferred specific embodiment of the present invention, the data entry additionally contains the identification or recognition mark of the particular machine company or operator, so that a central settlement of accounts is also possible for machines of several operators.

Pursuant to another preferred specific embodiment of the present invention, the programmable maximum value of the voucher is limited; when the value of bills received exceeds this limiting value, this is taken into consideration by the issuance of at least one further voucher. This prevents such vouchers from having too great of a value.

In order to also automate the return or refund of the equivalent value of bills received during an interrupted payment procedure, it is finally proposed pursuant to the present invention to accomplish the return of money in the central office with the aid of an automatic money return machine.

The vending-type machine for goods and/or services of the present invention is characterized primarily in that: a magnetic card processor, including a card printer, follows the printer for the coded inscription of the voucher; and the machine has a computer that controls the magnetic card processor and is provided with a data-protected memory for receiving a data entry that pertains to a respective refund process. Such components could also be installed without difficulty in existing vending-type machines, so that these machines can be retrofitted pursuant to the present invention.

Further specific features of the present invention will be described in detail subsequently.

DESCRIPTION OF PREFERRED EMBODIMENTS

Referring now to the drawings in detail, the vending machine illustrated in the drawings serves, for example, as an automatic cashier for the payment of parking fees. As one enters a parking garage, a parking card or ticket is removed to open the entrance barrier. Prior to picking up one's vehicle, this parking ticket is inserted into a slot 1 for the payment of the parking time; in the illustrated embodiment, this parking ticket slot 1 is disposed below a panel 2 on which the operating instructions required for the vending-type machine are located. Next to this panel 2, the amount that is to be paid for the respective parking time is indicated via a display mechanism 3. This amount can be paid for by depositing coins and/or bills; the machine gives back any change via a return tray 4, which is closed off by a flap. A receipt can also be obtained from the return tray 4 after a receipt button 5 is pressed. The coins used for paying the amount indicated on the display mechanism 3 are fed to the vending-type machine through a coin slot 6. Bills provided for payment are conveyed via a carriage 7 to a bill-checking mechanism 8, which can be seen in FIG. 2.

Figure 2:
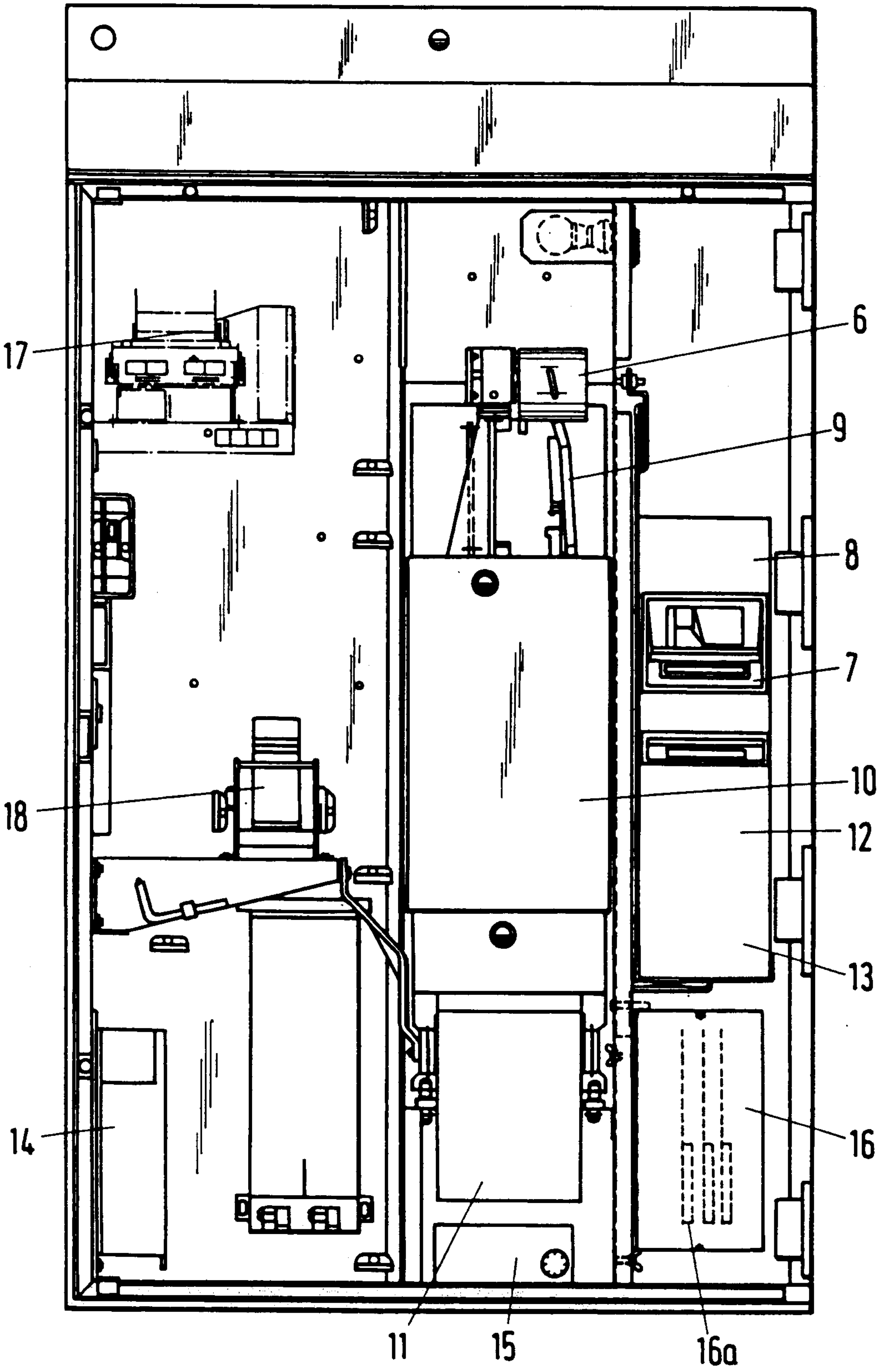
FIG. 2 is a view that shows the machine of FIG. 1 with the front opened.

FIG. 2 furthermore shows a coin-checking mechanism 9 that follows the coin slot 6. Following the coin-checking mechanism 9 is a coin-processing device 10 that includes an intermediate cash box. From the coin-processing device 10, coins received therein pass into a coin box 11. In a similar manner, a bill-processing device 12, which includes a cash box 13, follows the bill-checking mechanism 8.

In addition to showing a power supply 14 and an air conditioning unit 15, FIG. 2 also shows a computer 16 that controls all of the procedures in the vending-type machine. This computer 16 is connected via non-illustrated data-conveying line to a central computer that is located at some other location. The computer 16 also controls a printer 17, which is used, for example, to produce receipts. Finally, FIG. 2 shows a magnetic card processor, including a plain or coded language printer 18 that reads the data or information placed on a magnetic strip on the parking ticket for the further processing in the automatic cashier, and after payment of the parking fee provides the magnetic strip with information that effects opening of the exit barrier of the parking garage within a predetermined period of time.

Disposed next to the coin slot 6 (see FIG. 1) is a correction button 19 that a customer can push in order to interrupt an already initiated payment procedure. The coins that have already been inserted, and that are being accommodated in an intermediate cash box, are in this case returned via the return tray 4. However, if the customer has already inserted a bill that was found to be genuine by the bill-checking mechanism 8, with this bill having been conveyed via the following bill-processing device 12 to the cash box 13, there is no possibility of returning such bills due to the fact that there is no intermediate cash box for bills received in this manner. Therefore, where such a payment process has been interrupted, in order for the customer to get back an equivalent value of the bank note or notes that have been inserted, a promissory note, coupon, or voucher is produced in the printer 17. A data entry in plain or coded language is printed on this voucher in the magnetic card processor with its printer 18. In addition to the value of the bill, the data entry contains the location indication of t he particular machine and the actual date with the time to the second. This data entry is simultaneously entered in a data-protected memory 16a of the computer 16. In addition, this data entry is magnetically coded via the magnetic card processor including the printer 18 for placement upon a magnetic strip of the voucher. Finally, via the non-illustrated data communication lines the data entry is fed to a data-protected memory of the central computer.

If the central computer is provided for vending machines of several companies or operators, the data entry additionally includes the recognition mark of the particular machine operator to whom the machine in question belongs. After transfer of the data entry via the data communication line to the memory of the central computer has been completed, the data entry in the memory 16a of the particular machine can be cleared. However, then further to retain the record of the data process or machine operation procedurally, it is finally possible to print out the data entry with the printer 17, preferably after transfer of the data entry to the data-protected memory or data bank of the central computer.

When a customer goes to a central office to redeem the voucher issued to him for a bill received during an interrupted payment process, the magnetically coded data entry on the voucher is read in a magnetic card reader. The data that is read is compared with the data in the memory bank of the central computer. If these data coincide with regard to the value of t he bill, the location identification, and the actual date and time, as well as possibly with regard to the recognition mark of the particular machine operator, the customer receives the equivalent value of the voucher in the central office. In this connection, it should be noted that the return or refund of a customer's money could also be effected with the aid of a money return machine, so that for this procedure no person is required in the central office.

So that the value of a particular voucher cannot become too high, the maximum value of the voucher can be limited by suitable programming. If the bill or bills that are received exceed this limiting value, this is taken into account by the issuance of at least one further voucher. The production and processing of these additional vouchers is effected in a manner similar to that described above.

The present invention is, of course, in no way restricted to the specific disclosure of the specification and drawings, but also encompasses any modifications within the scope of the appended claims.

What we claim is:

1. In a method of operating a vending-type machine for goods and/or services, with said machine having a computer that is connected via a data communication line with a central computer located in a central office, with said machine further including a bill-checking mechanism, bill-conveying mechanism for conveying a bill or bank note to a cash box, as well as a printer, which, upon interruption of a payment procedure after the transfer of at least one bill into said cash box, prints out a voucher for the equivalent value of the received bills as proof of entitlement for receiving a refund in said central office, the improvement including the steps of:

printing on said voucher a plain language as well as machine-readable coded data entry that in addition to the value of said bill, also includes the location indication of said machine, and the actual machine operation date and time in seconds;

entering said data entry in a data-protected memory of said machine and also entering said data entry, via said data communication line, in a data-protected memory of said central computer; and upon presentation of said voucher for redemption at said central office, reading said coded data entry on said voucher in a data reader and comparing this read data with said data stored in said memory of said central computer, and paying out said equivalent value when said comparison has determined that the data entry on said voucher is the same as the data stored in said memory.

2. A method according to claim 1, which includes the step, after transfer of said data entry to said data-protected memory of said central computer, of printing out said data entry via said printer.

3. A method according to claim 1, which includes the step, after transfer of said data entry, via said data communication line, to said memory of said central computer is completed, of clearing said data entry in said memory of said machine.

4. A method according to claim 1, in which said data entry additionally includes a recognition mark of a particular machine operator.

5. A method according to claim 1, which includes the steps of: limiting the maximum value of said voucher; and issuing at least one additional voucher to take care of a value for received bills that exceeds said maximum value.

6. A method according to claim 1, in which refund of money in said central office is effected with the aid of an automated money return machine.

* * * * *

UNITED STATES PATENT AND TRADEMARK OFFICE
CERTIFICATE OF CORRECTION

PATENT NO. : 5,055,657

DATED : Oct. 8, 1991

INVENTOR(S) : Gert Miller et al

It is certified that error appears in the above-identified patent and that said Letters Patent is hereby corrected as shown below:

Title page, item:

[75] Inventors: Gert Miller, Mönchengladbach; Heinz-Gerd Jendges, Kempken St. Hubert; Norbert Crynen, Mönchengladbach; all of Federal Republic of Germany

Signed and Sealed this

Twenty-third Day of March, 1993

*Attest:*

STEPHEN G. KUNIN

*Attesting Officer*

*Acting Commissioner of Patents and Trademarks*